United States Patent
Ton et al.

(10) Patent No.: US 8,966,032 B2
(45) Date of Patent: Feb. 24, 2015

(54) SYSTEM AND METHOD FOR PROPAGATING PERSONAL IDENTIFICATION INFORMATION TO COMMUNICATION DEVICES

(75) Inventors: Rafael Ton, Yokneam (IL); Yoad Gidron, Ramot Menashe (IL)

(73) Assignee: Amdocs Software Systems Limited, Dublin (IE)

( * ) Notice: Subject to any disclaimer, the term of this patent is extended or adjusted under 35 U.S.C. 154(b) by 1072 days.

(21) Appl. No.: 12/531,069

(22) PCT Filed: Mar. 13, 2008

(86) PCT No.: PCT/IL2008/000359
§ 371 (c)(1),
(2), (4) Date: Sep. 14, 2009

(87) PCT Pub. No.: WO2008/111081
PCT Pub. Date: Sep. 18, 2008

(65) Prior Publication Data
US 2010/0088430 A1   Apr. 8, 2010

Related U.S. Application Data

(60) Provisional application No. 60/906,805, filed on Mar. 14, 2007.

(51) Int. Cl.
| | | |
|---|---|---|
| G06F 15/16 | (2006.01) | |
| H04W 8/20 | (2009.01) | |
| H04L 29/08 | (2006.01) | |
| H04L 29/12 | (2006.01) | |
| H04L 12/58 | (2006.01) | |

(52) U.S. Cl.
CPC ............... *H04W 8/20* (2013.01); *H04L 67/306* (2013.01); *H04L 61/1594* (2013.01); *H04L 29/12047* (2013.01); *H04L 51/38* (2013.01); *H04L 67/1095* (2013.01)
USPC ................ 709/223; 709/219; 709/229; 726/5

(58) Field of Classification Search
CPC .......... H04L 29/12047; H04L 61/15–61/1594; H04L 51/24; H04L 51/28; H04L 51/34; H04L 29/1215; H04L 29/12122; H04L 29/12198; H04L 29/12594; H04L 51/38; H04L 67/306; H04L 67/1095; H04W 8/18; H04W 8/20
See application file for complete search history.

(56) References Cited

U.S. PATENT DOCUMENTS

| | | | | |
|---|---|---|---|---|
| 6,823,373 | B1 * | 11/2004 | Pancha et al. .................. | 709/219 |
| 7,003,546 | B1 * | 2/2006 | Cheah ............................ | 709/217 |
| 7,444,392 | B2 * | 10/2008 | Rhoads et al. ................ | 709/219 |
| 7,933,587 | B1 * | 4/2011 | Swan .......................... | 455/412.1 |
| 7,970,017 | B2 * | 6/2011 | O'Neil ........................... | 370/503 |

(Continued)

OTHER PUBLICATIONS

Written Opinion and International Search Report from International Application No. PCT/IL08/00359, dated Aug. 6, 2008.

*Primary Examiner* — Patrice Winder
(74) *Attorney, Agent, or Firm* — Zilka-Kotab, PC

(57) ABSTRACT

A system and method for propagating identification information among a communication device and a server, through an agent installed on the device. Such process optionally and preferably comprises synchronization between the server and the device, through the agent, such that one or both of the agent and the server may optionally "push" or "pull" information.

18 Claims, 4 Drawing Sheets

(56) References Cited

U.S. PATENT DOCUMENTS

| | | | |
|---|---|---|---|
| 2003/0069874 A1* | 4/2003 | Hertzog et al. | 707/1 |
| 2004/0225525 A1* | 11/2004 | Weitzman | 705/1 |
| 2005/0102328 A1* | 5/2005 | Ring et al. | 707/201 |
| 2006/0052091 A1* | 3/2006 | Onyon et al. | 455/415 |
| 2006/0080284 A1* | 4/2006 | Masonis et al. | 707/3 |
| 2006/0215569 A1 | 9/2006 | Khosravy et al. | |
| 2007/0023507 A1* | 2/2007 | Starbuck et al. | 235/382 |
| 2007/0027930 A1* | 2/2007 | Alvarado et al. | 707/200 |
| 2007/0053335 A1 | 3/2007 | Onyon et al. | |
| 2007/0056043 A1* | 3/2007 | Onyon et al. | 726/26 |
| 2007/0239895 A1* | 10/2007 | Alperin et al. | 709/246 |
| 2007/0294366 A1* | 12/2007 | Ozzie et al. | 709/217 |
| 2008/0082421 A1* | 4/2008 | Onyon et al. | 705/14 |
| 2008/0177745 A1* | 7/2008 | Eldering et al. | 707/10 |
| 2008/0208919 A1* | 8/2008 | i Dalfo et al. | 707/201 |
| 2008/0222127 A1* | 9/2008 | Bergin | 707/5 |
| 2009/0157732 A1* | 6/2009 | Hao et al. | 707/102 |
| 2009/0292762 A1* | 11/2009 | Mettala et al. | 709/203 |

* cited by examiner

SYSTEM AND METHOD FOR PROPAGATING PERSONAL IDENTIFICATION INFORMATION TO COMMUNICATION DEVICES

This Application is a national phase of, and claims priority from, PCT Application No. PCT/IL2008/000359 having International filing date of Mar. 13, 2008, which claims priority from U.S. Provisional Application No. 60/906,805, filed on Mar. 14, 2007, all of which are hereby incorporated by reference as if fully set forth herein.

FIELD OF THE INVENTION

The present invention relates to personal identification information saved in communication devices, and particularly for propagating such information among other users.

BACKGROUND OF THE INVENTION

Digitally enabled telephones, including cellular telephones, so called "smart phones", Java enabled phones and VoIP telephones (telephones which communicate through the "Voice over IP" protocol, also known as Internet telephones) are all able to communicate with a server. Unlike simple analog telephones, this ability to communicate with a server increases the variety and type of services which may be offered through such communication devices.

One type of service that may be offered through digital telephones is the ability to receive updated personal identification information, such as contact information from a server. For example, if a plurality of users wishes to receive information about changed contact details, such as a new telephone number for a subscriber, such users may receive such information through communication devices connected to a server, which can update their "address books" or stored information about telephone numbers and the subscribers associated therewith. Optionally other types of contact information may also be updated, including email and postal addresses, type of position held, photographs and the like. Such a service is useful for members of an organization, such as a company, for example, and for consumers who are interested for maintaining up-to-date contact information for their contacts. Current data synchronization services that are offered by network operators through protocols as SyncML (Synchronization Markup Language), synchronizes contact information and other Personal Information Management (PIM) data (e.g., calendar, notes), between a subscriber and a server. Synchronization between multiple subscribers is not provided by standardized systems.

Unfortunately, although the above service is useful for backup and restore in case of data loss, it can only redistribute information between telephones in the context of a single user account. Therefore, it has limited capacity for installing updated information and/or for distributing such information between different users across the system. Two-way communication between the telephone and the server is also limited, as the majority, if not all, communication is initiated by the telephone only ("pull").

SUMMARY OF THE INVENTION

There is thus an unmet need for, and it would be highly useful to have, a system and method for propagating personal identification information between a telephones or any other communication devices, using a central server.

The present invention overcomes the disadvantages of the background art by providing a system and method for propagating personal identification information between a communication device, through an agent installed on the communication device and utilization of the regular interfaces of the device (such as phonebook, gallery and SMS composition functions) and a central server. Such communication optionally and preferably comprises two-way synchronization between the server and the communication device, through the agent, such that each of the agent and the server may optionally "push" or "pull" information The server optionally serves as a central unit through which the information is optionally propagated from one agent to the other agents.

Upon synchronization, the agent and server preferably exchange information, such as for example updated personal identification information. As part of the synchronization process the agent provides information to the server, such as for example a change in certain identification information. For example, if the user of the communication device enters a change to the identification information in the communication device, whether the user's contact information and/or contact information of another person, the agent preferably propagates such a change to the server. The server then optionally distributes the change to a plurality of subscribers or even to all subscribers.

According to preferred embodiments of the present invention, the first time that synchronization occurs between the agent and the server, the server preferably creates a special contact in the address book of each user, more preferably through the agent. This contact is a "Self Contact" which represents the actual user of the communication device and preferably contains the owner's personal contact data, which is saved at the server (optionally in an associated storage and/or computer for example) and is preferably then propagated to other communication devices. This contact can be edited through the embedded address book (contact information) application of the communication device, such as a telephone for example, just like any other contact. However, changes in the Self Contact are optionally and preferably reflected at the data stored and/or controlled by the server, and propagated, by the server, to other users in the system who have that individual user as contact in their address books and who are members in the service, more preferably through synchronization with the server as described in greater detail below.

Synchronization between the agent and the server may optionally occur periodically, for example according to a pre-determined cycle, or alternatively synchronization may optionally occur upon detection of an event, for example upon changing identification information, or alternatively triggered by the server through a Communication Initiation Request (CIR).

According to preferred embodiments of the present invention, various types of information may optionally be exchanged through the synchronization process. For example, a user may optionally provide a picture through the telephone, of the user or of someone else, which may then optionally and preferably be associated with the contact details of that person. As a result the picture is associated with the incoming telephone call of that person, and automatically displayed by the phone. The agent may then preferably provide the picture to the server as part of the synchronization process. The server may then optionally distribute the picture to other users, for example through agents, again as part of the synchronization process.

According to other embodiments of the present innovation, the server transfers to the communication device or application only data that is capable of being handled by this device or application. For example, if user A inserts video data into the personal identification information (i.e. the Self Contact) of user A and user B uses a cellular telephone which does not support video, then the server does not transfer the video data to the cellular telephone of user B. Thus, preferably only information of a type and/or format which is supported by the capabilities of the receiving communication device and/or application is transferred upon updating of the Self Contact information. Optionally, the data is re-formatted and/or otherwise adjusted in order to match the capabilities of the receiving device or application.

Of course, text, sound (for example optionally with regard to a "ringtone"), photograph or other image, avatar, video, other visual information or indeed any other type of information may optionally be exchanged between the agent and the server as part of the Self Contact, such that the user may optionally indicate that such information is to be associated with the personal information of the user, and then optionally propagated to the communication devices of other users. In the case of certain types of information, such as music for example, there may optionally be added one or more safeguards to the information, for example to limit distribution to only one user and/or to a certain group of users, and/or users having certain rights or other characteristics. These safeguards may optionally be installed through the server such that only agents possessing a certain key or other characteristics may access it.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

Although the present invention is described with regard to telephones and other communication devices, it should be noted that any device featuring a data processor and featuring some kind of local storage, including but not limited to a flash memory, memory card, SIM card or a hard disk with the ability to support at least voice communication may be described as a telephone. For example a communication device may optionally be described as any application and/or device that manages an address book, phonebook, contacts, "buddy list" by IM (instant messaging) applications and/or the like; preferably voice and/or video communication is enabled. The device preferably comprises an agent which communicates with a synchronization server on a server through a wireless network, a computer network or a combination thereof, for example (and without limitation), cellular networks (GSM, GPRS, UMTS, CDMA, etc.), wireless networks (WiFi, WiMax, etc.) and the Internet. The agent and the synchronization server preferably communicate according to a proprietary protocol for synchronizing one or more data items, whether automatically or manually.

The agent according to the present invention is preferably operative over a wide variety of platforms and more preferably is "device agnostic". The agent may optionally be provided by the device manufacturer, using standard protocols such as OMA DS (SyncML), Optionally, the agent may be implemented using platforms including but are not limited to Java Micro Edition (J2ME), Symbian, Windows Mobile, BREW, STK, Windows (PC Client), Mobile Linux (Android, LiPS, LiMo, etc.), or Apple iPhone® or the like.

Optionally the agent is implemented as a J2ME MIDlet. The J2ME runtime environment is based on a virtual machine that runs on top of the phone's operating system and provides restricted access to some of the resources of the phone. The basic J2ME profile for mobile phones is the Mobile Information Device Profile (MIDP), but there are additional optional libraries that are available for accessing PIM data and the file system.

Optionally, implementation of the agent also uses the SIM Toolkit (STK), which enables the development of JavaCard applets that run on the SIM card. The STK environment is very limited in terms of functionality and space, but it provides essential access data that is stored on the SIM card, including the address book.

A "server" as termed herein optionally and preferably comprises any computer that is connected to a fixed-line IP network. It should be noted that optionally any device featuring a data processor and/or the ability to execute one or more instructions may be described as a computer, including but not limited to a PC (personal computer), a server, or a minicomputer. Any two or more of such devices in communication with each other, and/or any computer in communication with any other computer, may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
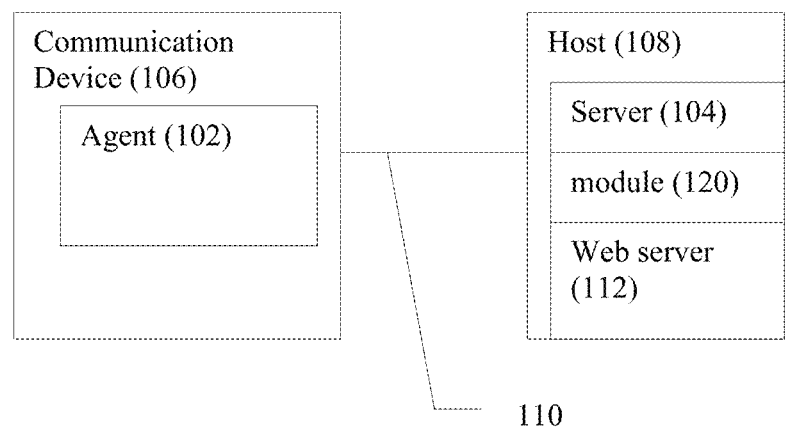
FIG. 1 is a schematic block diagram of an exemplary system according to the present invention.

The present invention is of a system and method for propagating identification information between users, preferably through communication devices, and optionally and more preferably through an agent installed on the communication device and a server. Such process optionally and preferably comprises two-way synchronization between the server and the communication device, through the agent, such that each of the agent and the server may optionally "push" or "pull" information. Alternatively only one of the agent and/or the server optionally initiates synchronization; optionally the user initiates synchronization through manual activation of the communication device, for example through manual activation of the agent at the communication device.

Upon synchronization, the server preferably exchanges information with the agent, such as for example updated personal identification information. Optionally and preferably the agent may also push information to the server, such as for example a change in certain contact information. For example, if the user enters a change to the contact information in the telephone, whether the user's contact information and/or contact information of another person, the agent preferably pushes such a change to the server. The server then optionally distributes the change to a plurality of other subscribers to the system or even to all subscribers.

According to preferred embodiments of the present invention, the agent which is installed on the telephone is a "thin client", such that the business logic, data adaptation and formatting are preferably performed in the server. Alternatively, the agent may optionally perform one or more of the above tasks in synchronization with the server.

Synchronization between the agent and the server may optionally occur periodically, for example according to a pre-determined cycle, or alternatively synchronization may optionally occur upon detection of an event, for example upon changing contact information, or alternatively triggered by the server through a Communication Initiation Request (CIR). A CIR can be sent as an SMS message, UDP packet, SIP message or any other mobile terminated (MT) protocol. On the device, the CIR is either handled by a built-in Push Registry mechanism (as implemented in J2ME), or by a proprietary listener.

According to preferred embodiments of the present invention, synchronization also includes backing up information from the telephone to the server, including but not limited to one or more of user determined telephone settings, contact information, software installed on the telephone and the like. If required, for example upon by a request by the user or alternatively as automatically determined by the agent, the backed up information is preferably restored through an interaction of the server and the agent. Preferably, the data may be restored on a telephone which is different from the one from which back-up was originally performed, for example if the user changes handsets.

According to preferred embodiments of the present invention, various types of information may optionally be exchanged through the synchronization process. For example, a user may optionally provide a picture through the telephone, of the user or of someone else, which may then optionally and preferably be associated with the contact details of that person. As a result, the picture is associated with the incoming telephone call of that person, and automatically displayed by the phone. The agent may then preferably provide the picture to the server as part of the synchronization process. The server may then preferably provide the picture to other agents, again as part of the synchronization process. Preferably the user providing the picture is able to determine whether this picture will be provided to other users when calling; more preferably, this user is also able to determine the ring tone which will be heard by that other user.

According to preferred embodiments of the present invention, at least the first time that synchronization occurs between the agent and the server, preferably for a particular user (such that if the telephone becomes identified with a different user, this process preferably occurs again), the system preferably creates a special contact in the address book of each user, more preferably through the agent. This contact is a "Self Contact" which represents the actual user of the telephone and preferably contains the telephone owner personal data which is saved at the server (for example optionally at an associated storage and/or other computer or device) and is copied to the telephone. This contact can be edited through the embedded address book (contact information) application of the telephone, just like any other contact. However, changes in the Self Contact are optionally and preferably reflected in the server and propagated, by the server, to other users in the system who have that individual user as contact in their address books and who are interested in the service, more preferably through synchronization with the server as described in greater detail below.

For example, assume that User A appears as contact in the address books of Users B and C. When User A updates his "self contact" with a new telephone number through the embedded Address book of his telephone, the agent which is installed on User A's phone preferably identifies this change and updates the server. The server in turn preferably distributes this update to Users B and C through the agents on their phones. As a result, Users B and C automatically and transparently receive the updated contact information of User A in their phones' address books.

The above scenario is applicable not only to contact information (such as telephone numbers, email and postal addresses), but also to the audible and visual representation of each user which may be associated to the Self Contact through the telephone book (contact list) of the telephone. A user can optionally determine which picture, sound ("ringtone") and/or video other users will see/hear when he/she calls them. This is done in a similar method as updating contact information—through the Self Contact. Most modern digital telephones allow the user to associate a ringtone, photo and video with any contact in his/her address book (automatically displayed/played when this contact calls in). Specifically, it can optionally and preferably be done with the Self Contact. When the agent identifies such an association, it preferably sends the information to the server along with the relevant media (picture, audio, and/or video). The server optionally and preferably distributes the information and media to all the users that have that individual user in their address books. As a result, when the first user calls another user (who is also using the system), the other user will see/hear the picture/audio/video that was determined by the first user.

The Self Contact may optionally include any type of PIM (personal information management) information for managing personal information, which may optionally include but is not limited to one or more of: name, address, title, company, personal notes; contact information (e.g., telephone numbers, e-mail address, instant messaging (IM) identification or address, physical address and/or any other type of contact detail or information); significant calendar dates such as birthday and one or more anniversaries; reminders; image, ringtone, video, audio, avatar and the like.

The principles and operation of the present invention may be better understood with reference to the drawings and the accompanying description. Although the below description is provided with regard to the operation of a telephone, whether a cellular or fixed line telephone, it is understood that it optionally applies to any type of communication device and/or application.

Referring now to the drawings, FIG. 1 is a schematic block diagram of an exemplary system according to the present invention. As shown, a system 100 features an agent 102 and a server 104. Agent 102 is shown as preferably being installed in telephone 106, while server 104 is optionally and preferably installed in the IP network of the operator or in a hosting site (ASP), shown as a host 108.

Server 104 is responsible for synchronizing and storing the personal data of users as obtained from agent 102, optionally and preferably through a server module 120 as shown. Data is preferably stored in its original format, allowing server 104 to adapt the data to the capabilities of each device (not shown).

Agent 102 preferably synchronizes various types of data (including but not limited to contact information, calendar, pictures, video, audio, messages, etc.) between telephone 106 and server 104. Agent 102 preferably operates periodically, checking for updated PIM items and media files; alternatively, agent 102 may be activated in response to a triggering event, such as a change to contact information for example Once activated, agent 102 optionally and preferably connects to server 104, more preferably through server module 120, exchanges the new or modified data, and receives updates from server 104. Such an exchange may optionally occur through push or pull, or combination thereof, by either or both of agent 102 and server 104. Agent 102 preferably does not require any interaction with the user, such that the synchronization process is preferably fully automatic. Agent 102 may optionally not provide a user interface or alternatively may preferably provide a simple configuration screen. Agent 102 can optionally be started by the user or initiated by server 104. Upon initiation for the first time, agent 102 preferably creates a "self contact" for the user in the contact information of telephone 106 (not shown). This self contact contains the user's own contact information; should the user change this information, agent 102 is preferably activated and sends this change to server 104, which then preferably propagates the changed contact information to other agents (and hence other telephones) in system 100 which have the user as a contact (not shown).

Communication between agent 102 and server 104 is performed through a communication channel 110, which may optionally be wired or wireless, and which also optionally may comprise a plurality of different "hops" (rather than a single direct connection). For example, communication channel 110 may optionally comprise a wireless packet-data network such as GPRS, EDGE, UMTS (WCDMA), EVDO, WiFi, etc. Preferably communication between agent 102 and server 104 is based upon IP (Internet Protocol) and thus is network-agnostic. Agent 102 and server 104 preferably communicate according to XML over HTTP/HTTPS. Triggers (signals or messages for initiating an event) are optionally and preferably sent over SMS, WAP Push or TCP/UDP.

Server 104 also preferably provides a Web interface (not shown) through a Web server 112, which allows users to edit their data, preferably with regard to the Self Contact (personal information) and initiate various operations of agent 102, including but not limited to Synchronization, Backup, Restore and Wipe-Out (for removing all information of a particular type or even all information on the telephone).

Figure 2:
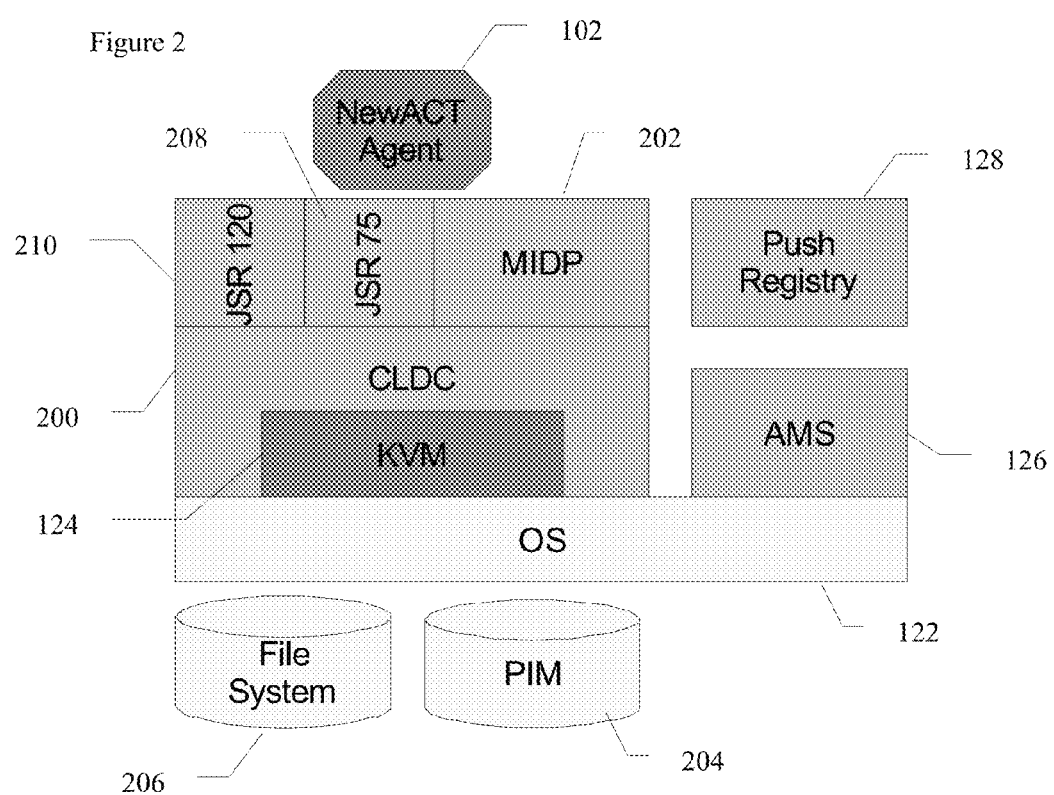
FIG. 2 is a schematic block diagram showing an exemplary, illustrative agent of FIG. 1 according to the present invention in greater detail.

FIG. 2 is a schematic block diagram showing an exemplary, illustrative agent of FIG. 1 according to the present invention in greater detail with regard to wireless communication.

Agent 102 is optionally and preferably implemented according to one of the following technologies: Mobile Java (J2ME or Java 2 platform, Micro Edition), open operating systems for telephones such as Symbian and Windows Mobile (not shown), Binary Runtime Environment for Wireless (BREW, Qualcomm's technology, applicable mostly for CDMA phones; not shown), or embedded applications (pre-integrated with the telephone's firmware; not shown).

With regard to Java based implementations of agent 102, which is the exemplary implementation described with regard to FIG. 2, preferably implementation is performed according to JSR (Java Specification Request) 185 and J2ME CLDC (Connected Limited Device Configuration) and MIDP (Mobile Information Device Profile) are used. CLDC is based on a virtual machine originally intended for use on telephones with limited functionality and/or computing power, such as mobile telephones for example. It is suitable for devices that have 16- to 32-bit RISC/CISC microprocessors/controllers and at least 160 KB of total memory available for the implementation of the virtual machine. CLDC provides the Java platform runtime and libraries, which in turn are used as the basis for MIDP. A CLDC interface 200 is shown for interacting with agent 102.

Mobile Information Device Profile (MIDP) is a specification published for the use of Java on embedded devices such as mobile phones and PDAs. Other profiles of J2ME are suitable for other types of devices. MIDP in turn provides the user interface for the telephone, network connectivity, local data storage, and application management through a standardized set of Java APIs. Agent 102 preferably uses the PIM API of JSR-75, in order to obtain such information as contact information, pictures and so forth.

Agent 102 preferably accesses PIM (Personal Information Management) data (contact information, calendar, notes and the like) 204 and a File System 206 through a JSR 75 interface 208.

The server (not shown, see FIG. 1) is preferably able to initiate communication with agent 102 through a JSR 120 interface 210, which provides a wireless messaging API (application programming interface) for SMS (Short Message Service) messages. JSR 180 API (not shown) provides access to communication over SIP (Session Initiation Protocol), as another non-limiting example for communication. JSR 120 interface 120 provides access to network specific SMS messaging on GSM (Global System for Mobile Communications) or CDMA (Code Division Multiple Access) networks. JSR 120 interface 120 also supports the ability of a Java program to be launched in response to a SMS message, also known as SMS push, such that for example agent 102 may optionally be activated in response to a SMS message from server 104 (not shown) and/or from another component of the system (not shown).

The telephone is operated according to an operating system shown as OS 122. OS 122 interacts with a Java Virtual Machine JVM 124 and an Application Management Software (AMS) 126. The telephone also features a push registry 128, which allows agent 102 to register for incoming messages, specially for triggering operations by Communication Initiation Requests (CIRs) sent by the server 104 (not shown).

Agent 102 may also, optionally or alternatively, communicate with various components of the telephone (not shown) through Synchronization Markup Language (SyncML, officially called OMA Data Synchronization), a standard technology to synchronize contact and calendar information between some type of mobile device and a computer (personal or network-based service). SyncML also provides support for push e-mail, thereby allowing e-mail messages to be "pushed" from server 104 (not shown) to agent 102. SyncML may optionally be used by agent 102 if for example the above types of communication technologies are not suitable for communicating with the telephone.

Agent 102 may also, optionally or alternatively, communicate with various components of the telephone (not shown) through the SIM Toolkit (STK), which for example provides access to contacts that are stored on the SIM card (not shown).

Agent 102 may also optionally or alternatively be implemented according to Binary Runtime Environment for Wireless (BREW, Qualcomm's technology). BREW features libraries and software frameworks for supporting programs such as agent 102, and also provides support for interactions between agent 102 and other components of the telephone. BREW also includes functionality for event handling.

Agent 102 may optionally be implemented on various types of "smart phones" implemented according to different types of open and/or otherwise accessible operating systems and/or devices accessible through different SDKs, including but not limited to such as the Windows Mobile OS (operating system) of Microsoft Corp, the Symbian operating system, the iPhone® SDK (Apple Inc) or Android of the Open Handset Alliance (initiated by Google).

Figure 3:
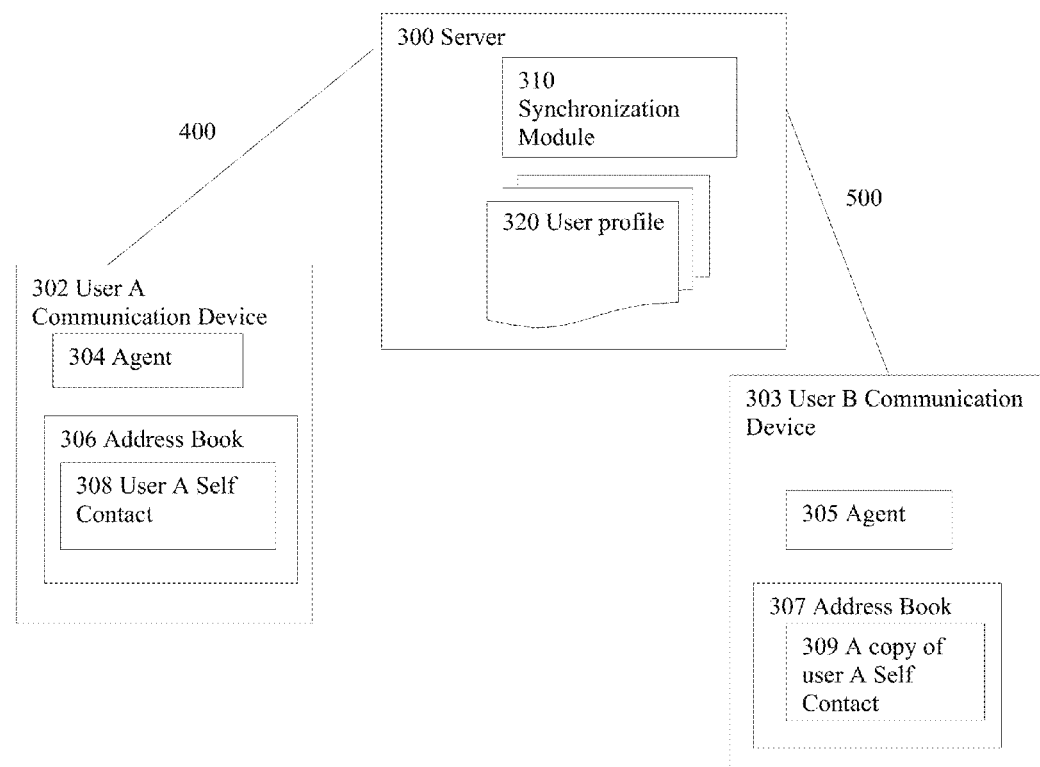
FIG. 3 is a schematic drawing of an exemplary system of the present invention for performing the self contact updating process.

FIG. 3 is a schematic drawing of an exemplary system according to the present invention for performing the self contact updating process. Server 300 optionally features synchronization module 310 and list of user profiles per each user in the system 320. A user is optionally a cellular telephone owner and/or user or any owner and/or user of a communication device and/or application that features an address book, contact list, repository of contact information and the like. For the purpose of description only, the users are described herein as the owner of a communication device, shown as user A communication device 302 and user B communication device 303. The user profile 320 is optionally created and/or configured by the system upon user registration, for example optionally using a web browser (not shown), whenever the user enrolls to the system or optionally copied from an existing data repository. The profile 320 is preferably created and/or configured to include the self contact information for that user. Self contact information preferably includes, at least, the user name (and/or other identifier) and telephone number (and/or other contact address or link) but can optionally include one or more other parameters.

Upon first synchronization between the server 300 and user A communication device 302 for example, self contact information is optionally copied from the user profile 320 in the server 300 and transferred via communication channel 400 to user A communication device 302. Such self contact information may also optionally be provided to the server 300 through a web based interface; in addition, such self contact information may also optionally be updated through such a web based interface. Alternatively or additionally, as described herein, such initial creation and/or updating of the self contact information may optionally be performed through user A communication device 302.

The agent 304 optionally copies this information to the address book 306. The owner and/or user of user A communication device 302 may optionally update the self contact information 308 using the address book 306 interface and/or as previously described through a web based interface. Server 300 optionally and periodically synchronizes with agent 304 for such updating when performed through user A communication device 302; otherwise, the web based interface preferably provides information directly to server 300. When user A of user A communication device 302 adds user B to address book 306, the synchronization process, handled by the agent 304 and the server 300, updates the user self contact information 308 in the user profile 320, using communication channel 400. The server 300 then optionally checks if user B is enrolled to the service. If so then user A self contact information 308 is preferably transferred to user B communication device 303 of user B via communication channel 500. The agent 305 optionally copies this information to the address book 307 of user B communication device 303 shown as copy of user A self contact information 309. The same process is preferably performed when user A updates self contact information 308.

Figure 4:
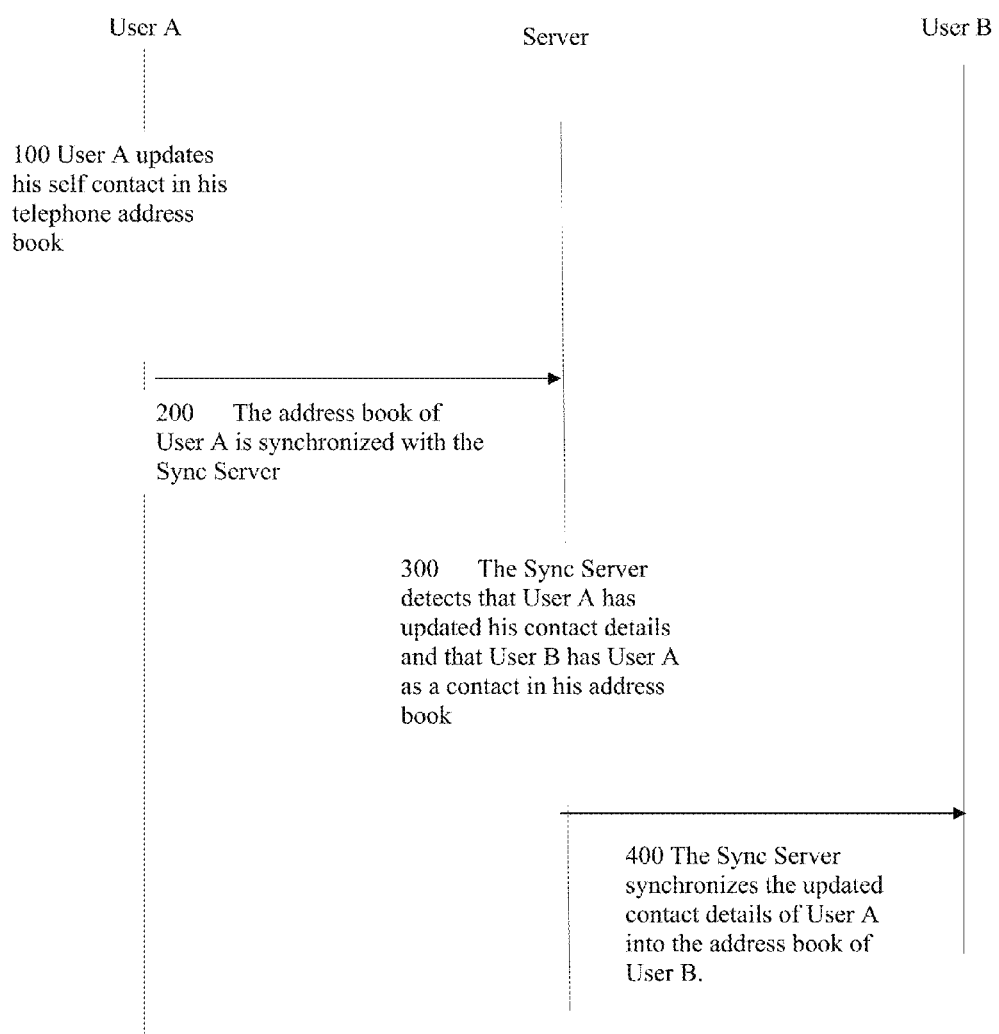
FIG. 4 is a flow diagram showing propagating the self-contact information from the owner of the telephone to another user.

FIG. 4 is a flow diagram showing the propagation of the self-contact information from the owner and/or user of the telephone to another user. First user A updates the self contact of user A with new information, such as a new photo, updated home address, new telephone number etc in the cellular telephone address book of user A (100). Self contact information is optionally updated via the address book interface, for example. Then, the server optionally synchronizes with user A cellular telephone and processes all of the new and relevant data in the address book (200). Next the server detects that user A has updated the contact details of user A, and that user B has user A as a contact in user B's address book (300). The server preferably synchronizes the updated contact details of user A into the address book of user B (400). This process is preferably performed by transferring the data to the agent on the cellular telephone of user B, which copies the data into the address book of the cellular telephone of user B.

While the invention has been described with respect to a limited number of embodiments, it will be appreciated that many variations, modifications and other applications of the invention may be made.

What is claimed is:

1. A method, comprising:
providing an agent for being operated by each of a plurality of communication devices;
providing a self contact comprising personal information for a user of a communication device of the plurality of communication devices, wherein the self contact is managed through the agent and is updated through an address book application on the communication device;
synchronizing the self contact between the agent and a server;
altering the self contact by the user with at least one alteration in the personal information through the address book application, including the user indicating a sound as being a part of the self contact;
in response to the alteration of the self contact by the user including the user indicating a sound as being a part of the self contact, propagating the at least one alteration including the sound from the self contact to at least one other of the plurality of communication devices apart from the communication device, if the user is listed as a contact at the at least one other of the plurality of communication devices, such that an updated copy of the self contact of the user is transferred to the at least one other of the plurality of communication devices; and
in response to a determination that the sound indicated by the user as being a part of the self contact is a portion of music, verifying by a server that each of the at least one other of the plurality of communication devices includes a key for accessing the portion of music prior to propagating the portion of music to the at least one other of the plurality of communication devices, for limiting distribution of the portion of music to only communication devices including the key.

2. The method of claim 1, wherein the synchronizing is initiated by the server.

3. The method of claim 1, wherein the synchronizing is initiated by the agent.

4. The method of claim 3, wherein the agent initiates the synchronizing according to alteration of data on the communication device.

5. The method of claim 4, wherein the data comprises at least one or more of contact information text, sound, image, avatar, video, other visual information.

6. The method of claim 5, wherein the sound comprises a ringtone.

7. The method of claim 5, wherein the image represents a photograph of the user or an image selected by the user.

8. The method of claim 1, further comprising:
creating the self contact for the user of the communication device upon first synchronization between the communication device and the server.

9. The method of claim 1, wherein said propagating said at least one alteration comprises:
determining a type of data of the at least one alteration;
determining whether the at least one other of the plurality of communication devices is capable of operating with the type of data; and
if so, propagating the at least one alteration to the at least one other of the plurality of communication devices.

10. The method of claim 1, wherein the communication device comprises a telephone.

11. The method of claim 1, wherein the communication device comprises a cellular telephone.

12. The method of claim 1, wherein the communication device is a mobile communication device.

13. The method of claim 12, wherein the mobile communication device comprises voice communication capability.

14. The method of claim 1, wherein the providing the self contact further comprises creating the self contact by another user with personal identification information of the user.

15. The method of claim 1, wherein the updated copy of the self contact of the user is transferred to an address book in each of the at least one other of the plurality of communication devices.

16. A method, comprising:
providing a self contact comprising personal information for a first user of a first communication device of a plurality of communication devices, wherein the self contact is managed through an agent and is updated through an address book application on the communication device;
altering the self contact by the first user with at least one alteration in the personal information through the address book, including the first user indicating a sound as being a part of the self contact;
detecting the at least one alteration to the self contact;
in response to the alteration of the self contact including the user indicating a sound as being a part of the self contact, propagating the at least one alteration including the sound from the self contact to at least one other of the plurality of communication devices apart from the communication device, if the user is listed as a contact at the at least one other of the plurality of communication devices, such that an updated copy of the self contact of the user is transferred to the at least one other of the plurality of communication devices; and
in response to a determination that the sound indicated by the user as being a part of the self contact is a portion of music, verifying by a server that each of the at least one other of the plurality of communication devices includes a key for accessing the portion of music prior to propagating the portion of music to the at least one other of the plurality of communication devices, for limiting distribution of the portion of music to only communication devices including the key.

17. The method of claim 16, wherein the propagating the at least one alteration comprises:
determining a type of data of the at least one alteration;
finding other users that have the first user in their address books as a contact;
determining whether the at least one other of the plurality of communication devices is capable of operating with the type of data; and
if so, propagating the at least one alteration to the at least one other of the plurality of communication devices.

18. The method of claim 7, wherein the alteration of the self contact by the user further includes the image being selected by the user, and in response to the selection of the image by the user, the image is distributed to the at least one other of the communication devices of other users having the user as a contact, such that the image is associated with incoming telephone calls from the user at the at least one other of the communication devices of the other users having the user as a contact.

* * * * *